Sept. 18, 1945.   C. R. HANNA   2,385,204
VELOCITY-COMPENSATED CONTROL MECHANISM
Filed Nov. 2, 1943   5 Sheets-Sheet 2

INVENTOR
Clinton R. Hanna.
BY
ATTORNEY

Sept. 18, 1945.   C. R. HANNA   2,385,204
VELOCITY-COMPENSATED CONTROL MECHANISM
Filed Nov. 2, 1943   5 Sheets-Sheet 3

INVENTOR
CLINTON R. HANNA.
BY
ATTORNEY

Sept. 18, 1945.   C. R. HANNA   2,385,204
VELOCITY-COMPENSATED CONTROL MECHANISM
Filed Nov. 2, 1943   5 Sheets-Sheet 4
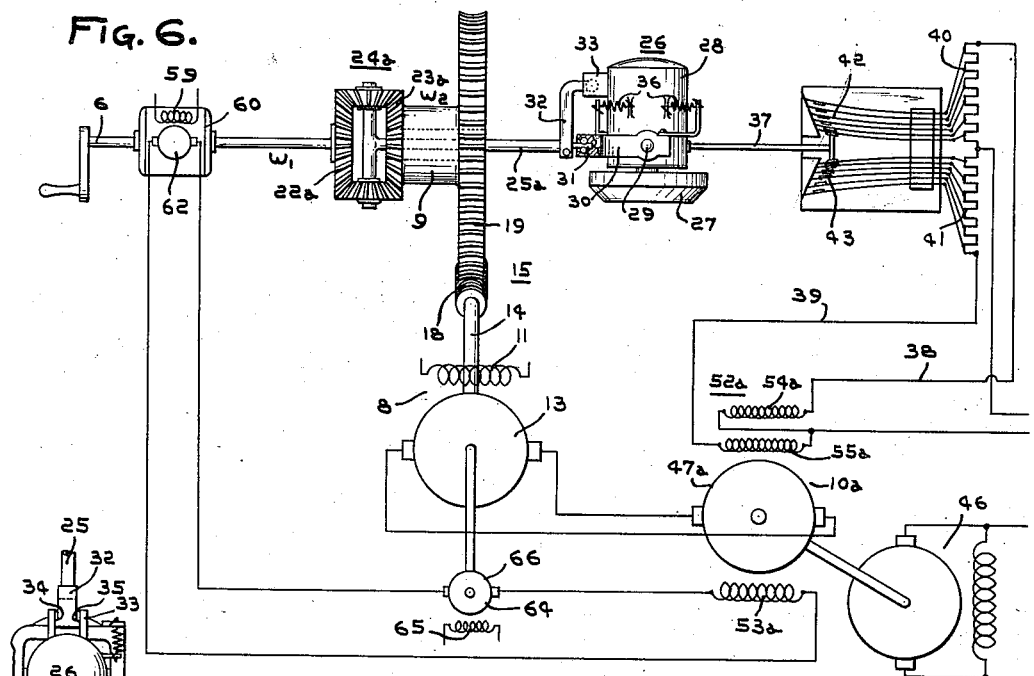
FIG. 6.
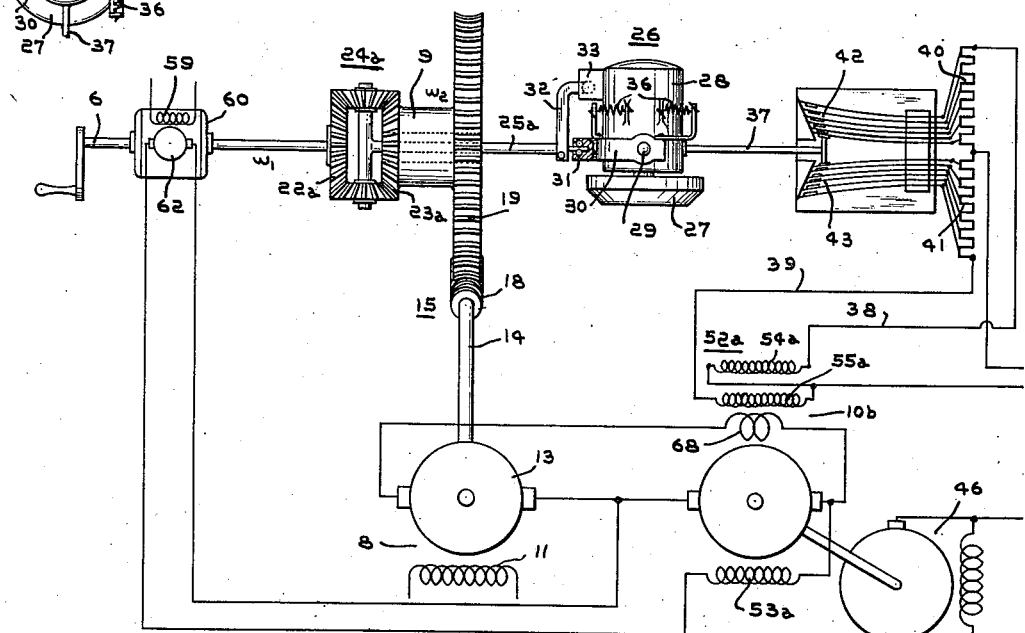
FIG. 7.
FIG. 8.
WITNESSES:
INVENTOR
CLINTON R. HANNA.
BY
ATTORNEY Sept. 18, 1945.　　　　C. R. HANNA　　　　2,385,204
VELOCITY-COMPENSATED CONTROL MECHANISM
Filed Nov. 2, 1943　　　5 Sheets-Sheet 5

INVENTOR
CLINTON R. HANNA.
BY
ATTORNEY

Patented Sept. 18, 1945

2,385,204

UNITED STATES PATENT OFFICE 2,385,204

VELOCITY-COMPENSATED CONTROL MECHANISM

Clinton R. Hanna, Pittsburgh, Pa., assignor to Westinghouse Electric Corporation, East Pittsburgh, Pa., a corporation of Pennsylvania Application November 2, 1943, Serial No. 508,742

19 Claims. (Cl. 172—239)

The invention relates to a position regulator of the follow-up type which has a driving motor responsive to movement of an input member to cause an output member to follow the input member and it has for an object to provide apparatus of this character wherein the regulator operates in response to speed of at least one of the members to maintain driving motor speed.

A further object of the invention is to provide apparatus of the above character wherein the regulator is operative in response to speeds both of the input member and of the output or position-regulated member to maintain the speed of the latter and to provide for damped operation thereof.

In a position regulator employing a direct current motor supplied by a variable voltage generator, the excitation of the latter must increase with speed as well as load. Therefore, the controlling mechanism including the input member, in addition to exciting the generator to operate the driving motor to cause the output member to follow the input member, is also operative to provide additional excitation in proportion to speed of the input member and in a direction to compensate the error otherwise introduced on account of speed. It is further desirable to provide for increase in damping by the development of torques opposing any vibrational velocity of the controlled mechanism or output member in such a manner that the controlling system has no effect on the damping, that is, the stability of the regulator is not affected by the controlling system. More particularly, the controlling or input member operates an auxiliary generator, which excites the main generator in proportion to speed of the input member so as to maintain speed of the motor and the mechanism driven thereby, and means effective in proportion to speed of the output member or the controlled mechanism is provided to excite the generator in a direction to oppose velocity of the controlled mechanism or output member to provide for damped operation. Preferably, the driving motor for the controlled or output member drives a second auxiliary generator or exciter connected in series with the first auxiliary generator and with a field element of the main generator and arranged to oppose or buck the first auxiliary generator to provide adequate compensation for input speed and damping as a result of the auxiliary exciter or generator responding to output speed. With this arrangement, the output of the first exciter or auxiliary generator has no effect on the damping resulting from the output of the second exciter because an oscillation of the controlled mechanism or output member relative to the input member causes variations in the output of the second exciter which have no counterpart in that of the first exciter. Further, cranking effort of the controlling or input member may be reduced by having an exciter driven by the input member and whose output is amplified by a motor-driven auxiliary generator, the latter being used, with the second auxiliary exciter or generator, to excite the main generator field, any delay resulting from such addition having no effect on the stability of the regulator for the reason that the addition is not in the regulator portion of the circuit.

Accordingly, a further object of the invention is to provide a controlled or output member which is caused to follow a controlling or input member by means of a direct current motor supplied with current by a variable voltage generator excited in proportion to speed of the input or controlling member and in a direction to maintain speed of the driving motor and excited in proportion to speed of the output member but in a direction to oppose velocity of the driving motor to provide for damped operation.

Another object of the invention is to provide a brake normally effective to hold the regulator in a position to which adjusted with means to prevent application thereof until the speed of the output member is reduced to a desired extent.

Where the regulator is used to position a body having relatively large inertia, for example, a heavy gun, provision should be made for ease of manual operation of the input member. Further, the apparatus should respond and operate rapidly with preservation of stability and avoidance of overtravel. Prompt response and accurate follow-up operation are secured by energizing the driving motor in response to a gyro moved by a differential operatively connected to the input and output members. The burden of energization of the driving motor is shared with means responsive to speed of either the input member or the output member, in consequence of which rapid operation is possible with relatively small gyro-controlled power over a relatively small voltage range. The controlling mechanism includes an input member connected by speed-increasing gearing to a flywheel, and a friction clutch is arranged between the flywheel and the input member, the clutch slipping in the event of excessive torque being applied manually to the input member. A friction clutch is also arranged between the controlling mechanism and the differential to avoid input to the latter beyond the capacity of the regulator to follow. Ease of manual operation of the input member is promoted by having a small exciter connected thereto and by amplifying the output of the exciter for energizing the driving motor to compensate for the error due to speed.

Accordingly, therefore, a further object of the invention is to provide, for apparatus of the above character, controlling mechanism including an input member connected by speed-increasing gearing to a flywheel together with a friction slip clutch arranged between the input member and the flywheel.

Another object of the invention is to provide apparatus of the above character wherein a friction or slip clutch is arranged between the controlling mechanism and the differential to guard against the possibility of motion being put into the controlling mechanism beyond the capacity thereof to follow.

A further object of the invention is to provide apparatus of the above character wherein the output of the exciter driven by the input member is amplified so that the exciter may be made relatively small to facilitate ease of operation of the input member.

These and other objects are effected by the invention as will be apparent from the following description and claims taken in connection with the accompanying drawings, forming a part of this application, in which:

Figs. 6 and 7 are diagrammatic simplified views illustrative of principles of the invention;

Fig. 8 is a detail view of the frictional coupling arrangement applied in connection with the gyro.

Figure 1:
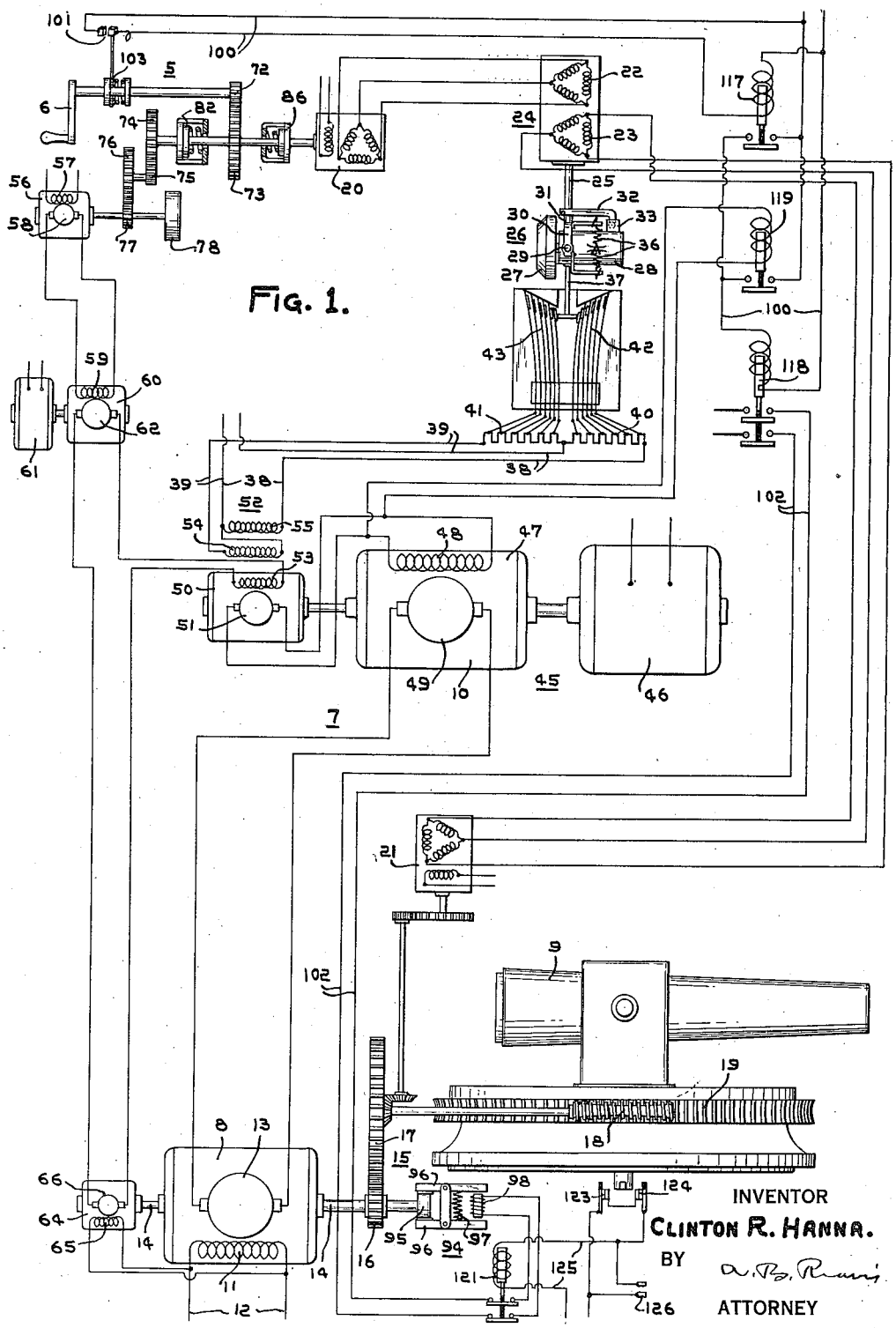
Fig. 1 is a diagrammatic view of the improved controlling system.
Figure 2:
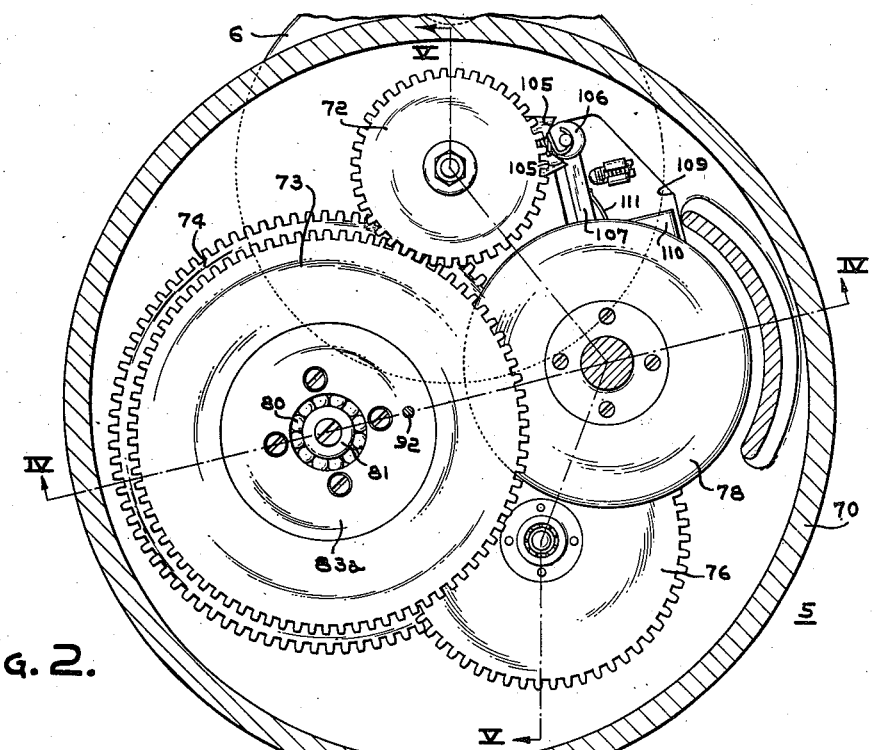
Fig. 2 is a transverse sectional view taken along the line II—II of Fig. 4 and showing a preferred form of the controlling mechanism.
Figure 3:
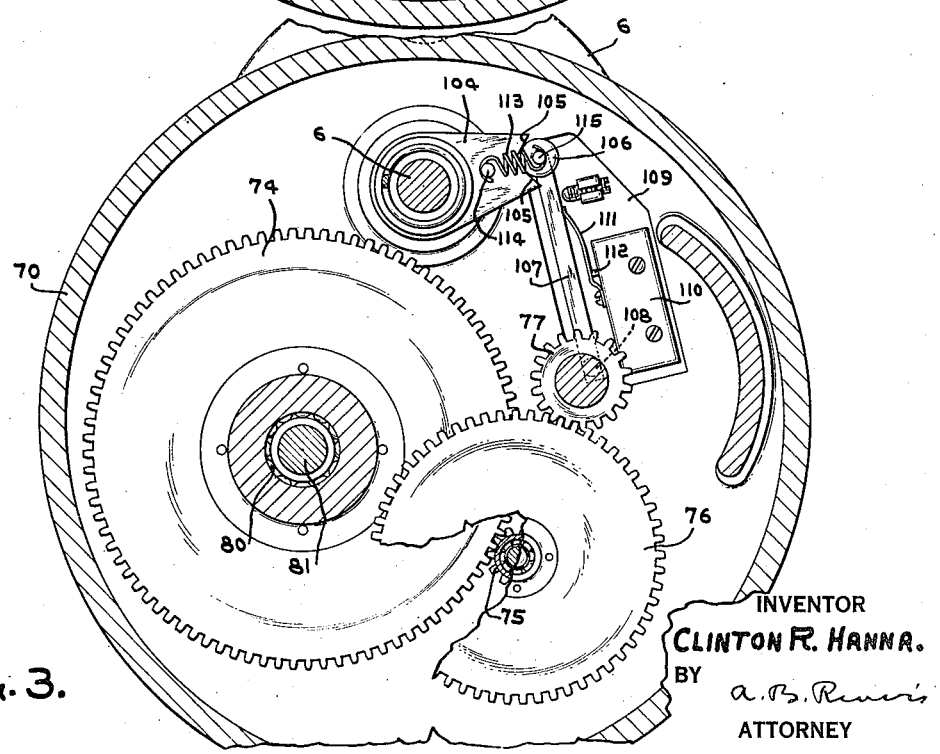
Fig. 3 is a view similar to Fig. 2 but taken along the section line III—III of Fig. 2.
Figure 4:
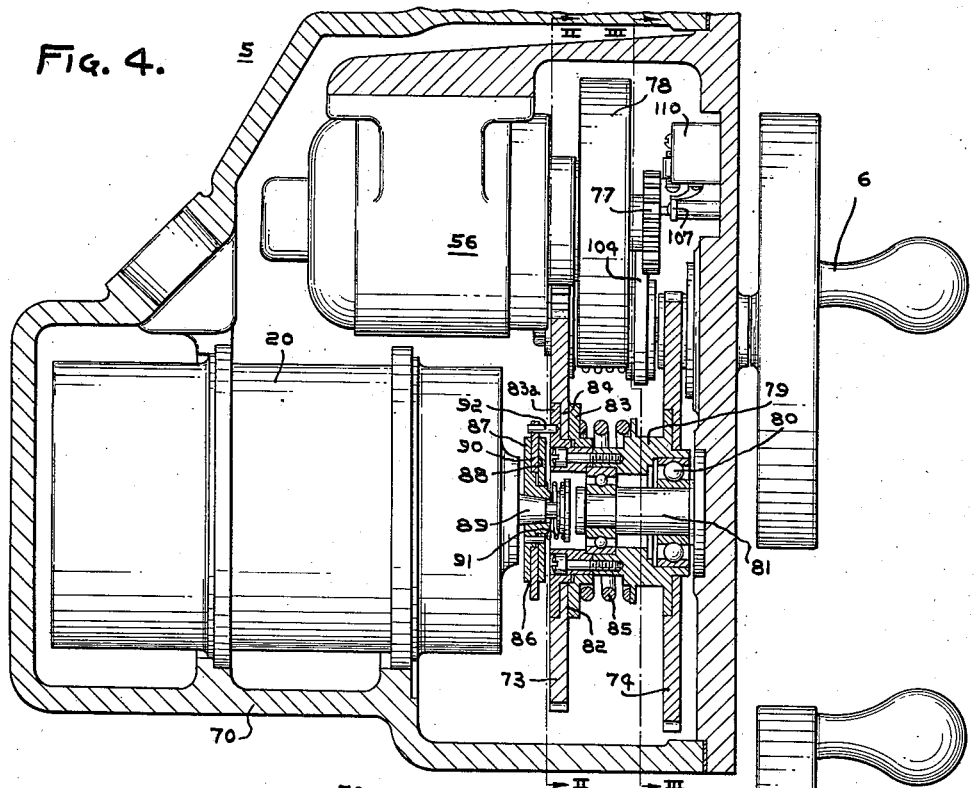
Fig. 4 is a longitudinal sectional view of the apparatus shown in Fig. 1 and taken along the line IV—IV of Fig. 2.

Referring to Fig. 1, there is shown controlling mechanism, at 5, including an input member 6 and position-regulating mechanism, at 7, including a direct current motor 8 for driving an output member, for example, the gun 9, into positional agreement with the input member 6, the motor being supplied with current by a variable voltage generator 10.

As shown, the driving motor 8 is separately excited, it including a field element 11, excited from a supply line 12, and an armature 13. The armature is carried by a shaft 14 connected by suitable transmission mechanism, at 15, to the output member 9. For example, the shaft 14 has a pinion 16 meshing with the gear 17 driving a worm 18 meshing with a worm gear 19 to which is connected the controlled or output member 9.

The variable voltage generator 10 supplies current to the driving motor armature 13 to operate the latter in opposite directions to cause the output member 9 to follow the input member 6 or to drive it into positional agreement with the latter in response to movement of the input member and to the velocity of deviation of the latter with respect to the output member and in response to speed of the input and output members, control in proportion to the input or controlling member speed providing compensation for the error otherwise existing on account of speed and that in response to the controlled or output member speed opposing input to provide for damping of the regulator, damping being increased because of torques developed and which oppose any vibrational velocity of the output member or regulator mechanism.

Referring first to the sensing of input motion and the velocity of deviation of the input member with respect to the output member, the controlling mechanism, at 5, and the controlled mechanism or regulator, at 7, are operatively connected to electrical transmitters 20 and 21, respectively, and the latter are connected electrically to the receivers 22 and 23 forming input elements of the electric differential, at 24, having an output element 25, which moves in response to differential action of the input elements. The synchronously connected transmitters and receivers and the arrangement of the latter as input elements are well known in the art and further description thereof is unnecessary.

The gyro, at 26, has first and second axes which are transverse to each other and to the spin axis, the first axis being the axis of the output element 25 and the second axis being the precession axis which is normal both to the first axis and to the rotor spin axis.

The gyro comprises a rotor 27 journalled in the casing or inner frame 28 and the latter is connected by pivots 29 to the outer frame 30 having a pivotal connection 31 with respect to the output element 25. The coupling, comprising cooperating members 32 and 33 attached to the output element 25 and to the inner frame 28, provides for displacement of the gyro about its said first axis. Velocity of the gyro about the input or first axis, namely, the axis of the output element 25, is accompanied by proportional torque about the second axis, that is, the output or precession axis defined by the axis of the pivots 29.

The coupling members 32 and 33 have engageable surfaces, at 34 and 35 (see Fig. 8), arranged in planes normal to the precession or output axis to provide the necessary freedom for movement about that axis. Centering springs 36 connect the inner and outer frames 28 and 30 and they provide a scale effect so that the extent of movement about the output or precession axis is proportional to the torque about the latter axis and is, therefore, proportional to the velocity of displacement or deviation about the first or input axis. Due to gyroscopic action, the friction surfaces engage to damp precessional oscillations.

The inner frame 28 of the gyro has an actuator 37 which moves in response to angular displacements of the gyro about said first or input and said second or output axes to provide for current flow in opposite directions and at varying voltages. To this end, there is shown a pair of circuits 39 and 39, each of which is provided with voltage-varying means, such means preferably comprising resistors 40 and 41 having groups of contacts 42 and 43 connected therealong. The contacts of each circuit are arranged for progressive engagement and disengagement to shunt or include portions of the resistance in circuit to vary the voltage. The groups of contacts 42 and 43 are so arranged in relation to the actuator 37 that movement of the latter in opposite directions causes the voltages in the two circuits 38 and 39 to vary differentially in opposite directions. The voltage variations of the two circuits are used to secure current flow in opposite directions and at varying voltages in the armature circuit of the driving motor 8.

The follow-up arrangement so far described is claimed in the application of Mikina, Lynn and myself, Serial No. 412,612, filed September 27, 1941, for Electric turret traverse; and such follow-up arrangement with electrical transmitters and an electrical differential is more particularly disclosed and claimed in the application of Wolfert and myself, Serial No. 481,190, filed March 31, 1943, for Position regulators.

Preferably, the regulator or controlled mechanism, at 7, includes a main motor-generator set, at 45, comprising a motor 46 driving the direct current generator 10 having a field element 48 and an armature 49, the latter being arranged in series with the driving motor armature 13.

The field element 48 of the generator 47 is excited in opposite directions in response to varying voltages provided in said circuits 38 and 39. As shown, this is effected by utilizing an exciter or generator 50 having its armature 51 connected in series with the generator field element 48 and having first and second field components, at 52 and 53.

The first field component, at 52, preferably comprises the reversely-arranged windings 54 and 55 included in the circuits 38 and 39, respectively. If, for example, the contacts 42 are progressively engaged, then portions of the resistance of the resistor 40 will be progressively shunted to cause the circuit 38 to impress progressively increasing voltage on the winding 54. With movement of the actuator 37 in the other direction and progressive engagement of the contacts 43, the circuit 39 will be caused to impress progressively increasing voltage on the winding 55. As the contacts are progressively disengaged, the voltages are progressively diminished.

The other, or second, field component 53 has voltages impressed thereon which are proportional to speeds of the controlling mechanism, at 5, and the controlled mechanism, at 7. Excitation of the winding 53 in proportion to speed of the controlling mechanism occurs in such a direction as to maintain speed of the driving motor 8, while excitation thereof in proportion to speed of the controlled mechanism opposes velocity of such motor with the result that damping occurs.

Referring to the means for exciting the second field component 53 in proportion to speeds of the input and output members, there is shown an auxiliary exciter 56 operatively connected to the input member 6, and including field and armature elements 57 and 58, the armature element being connected in series with the field element 59 of the auxiliary generator 60 driven by the motor 61, the generator including an armature 62 connected in series with the field component 53. The regulator mechanism includes an auxiliary generator 64 connected to the motor shaft 14 and including field and armature elements 65 and 66, the armature element being connected in series with the armature element 62 and the second field component 53.

While the effect of the armature element 62 is to provide for excitation of the generator 47 in proportion to speed of the controlling mechanism, at 5, in order to maintain speed of the driving motor 8, the effect of the auxiliary generator 64 is to oppose or buck the generator 60, that is, it provides excitation in proportion to speed of the regulator mechanism but which is in such a direction as to oppose driving motor velocity.

The fundamental relations involved in the apparatus so far described will be more readily understood from a consideration of simplified Figs. 6 and 7, wherein the controlling or input member 6 and the controlled or output member 9 are operatively connected by a differential having an output element 24a which is moved in response to deviation or positional displacement of the input elements 22a and 23a. A gyro 26 is moved by the output element and precession thereof is utilized to operate the contacts for voltage control of the reversely-arranged windings 54a and 55a of the first field component of the generator 47a.

With the usual system employing a variable voltage generator and D. C. motor, excitation must increase with speed as well as load, and, by input compensation, the error which would result from speed is readily compensated by providing an auxiliary exciter or D. C. generator connected to the input element or controlling member and arranged to supply the part of the excitation required for maintaining speed. Therefore, the auxiliary generator exciter 60 is indicated diagrammatically as being connected to the input member 6; and, as the voltage of a generator is proportional to the rate at which the lines of flux are cut, it will be apparent that the voltage output is, therefore, a function of velocity of the input member, and this voltage is impressed on the second field component 53a of the generator 47a. In like manner, the auxiliary generator or exciter 64 connected to the driving motor 13 provides voltage which is a function of the velocity of the controlled member.

With the exciters 60 and 64 arranged in bucking relation, it will be apparent that the effect of the exciter 60 is to provide excitation for the generator 10a which is proportional to the velocity of the input member 6 and in a direction to maintain speed of the driving motor 8. On the other hand, while the effect of the exciter 64 is to provide excitation in proportion to the velocity of the output member, the excitation due thereto is in such a direction as to oppose velocity of the driving motor, that is, while the exciter 60 compensates for error due to speed, the exciter 64 serves to damp velocity oscillations of the driven mechanism with the result that overtravel, hunting or oscillation of the latter is avoided.

Referring to Fig. 6, the differential is shown as being driven at one side by the controlling or input member or handcrank 6 and at the other side by the motor 8 through the worm gearing. The cage of the differential actuates the output member 25a connected through the coupling arrangement to the gyro 26 which has the precessionally-moved part 37 for progressively engaging and disengaging the contacts 42 and 43 to increase the excitation of the windings 54a and 55a of the generator 10a depending on the direction of error. The auxiliary generator 60 on the handcrank or input member excites the field component 53a in proportion to the input speed $\omega_1$ and in a direction to maintain speed of the driving motor 8 and the output member 9.

The generator 64 coupled to the driving motor 8 excites the field component 53a in proportion to the output or controlled member speed $\omega_2$ and in a direction to oppose any output velocity, that is, in a damping sense. If for the best damping $E_2 = K_2\omega_2$ and, for the required velocity correction, $E_1 - E_2 = K_1 \omega_1$, where $E_1$ and $E_2$ represent the output voltages of the generators or auxiliary exciters 60 and 64 and $K_1$ and $K_2$ are constants, then, for steady velocity conditions, where $\omega_1 = \omega_2$, $$E_1 = (K_1 + K_2) \omega_1$$

that is, $E_1$ overpowers the retarding effect of $E_2$ so far as average velocities are concerned. $E_1$, however, has no effect upon the damping which results from $E_2$ because an oscillation of the output member relative to the input member causes variations in $E_2$ which have no counterpart in $E_1$.

In Fig. 7, there is shown an arrangement equivalent to that of Fig. 6 except that the function of the damping generator or exciter 64 is achieved differently. Instead of the field component 53a being separate from the armature of the generator 10b, it is arranged in shunt therewith and the latter has also a series field element 68. The combination of series and shunt fields 68 and 53a of the generator 10b are used in such a manner as to obtain a M. M. F. proportional to the generated voltage of the driving motor 8 which is also proportional to speed, that is, the speed or velocity $\omega_2$ of the controlled or output member 9. If this is done, the voltage from the exciter or generator 60 may be supplied in series with the shunt field.

While, in Fig. 1, the exciter 56 is geared up from the controlling member or handcrank 6 and delivers its power to the field of an intervening exciter or generator 60, whose output is fed to the field component 53 so as to reduce the cranking effort, the delay caused by the addition of such exciter or intervening generator 60 has no effect upon stability of the regulating system because it is not in the position regulator portion of the circuit.

In Figs. 2, 3, 4 and 5, there is shown the preferred form of controlling mechanism, at 5. Such mechanism is enclosed within a casing 70, the controlling member 6 being carried by the bearings 71 and the gear 72 being connected thereto. The gear 72 meshes with the gear 73 arranged coaxially with the gear 74, the latter meshing with the pinion 75 (Fig. 3) coaxial with the gear 76, which, in turn, meshes with the pinion 77, the exciter 56 and the flywheel 78 being driven at increased rotational speed as compared to the driving member 6. The transmitter 20 is coupled, in the manner to be described, to the gear 73 so that it may be driven at a suitable speed.

The gears 73 and 74 are maintained in coaxial relation by a hub construction 79 carried by bearings 80 mounted on the stub shaft 81 connected to the casing. A frictional clutch 82 connects the gear 73 to the hub structure 79, such clutch providing for slippage in the event that an attempt is made to turn the controlling member 6 too rapidly, the clutch preferably including plate elements 83 and 83a frictionally engaging an intervening element 84 of the gear 73 under the force of the spring 85.

The connection between the gear 73 and the electrical transmitter 20 also includes a frictional slip clutch 86, the clutch comprising plate elements 87 and 88 carried by the rotor 89 of the transmitter and frictionally engaging the intervening plate element 90 under the force of the spring 91, the intermediate plate element 90 being connected to the gear by means of the pin coupling 92.

The frictional clutch 82 in the drive between the controlling or input member and the flywheel prevents acceleration or retardation in excess of a fixed maximum which may be adjusted by the relation of friction torque to flywheel inertia. The slip clutch arranged ahead of the electrical transmitter allows for slipping when the controlling member 6 or handwheel is rotated faster than the controlled mechanism or motor output can follow.

To provide for stopping of the controlled mechanism, at 7, without oscillation, there is provided a friction brake, at 94, for the driving motor shaft 14, the latter preferably having a brake drum 95 for engagement by the shoes 96. The shoes 96 are preferably frictionally engaged with the drum 95 by means of a spring 97 and they are released by a magnet 98 whose winding is included in the power circuit 102, the latter being controlled in the manner to be immediately described. Upon movement of the controlling or input member 6, the brake, at 94, is released by energizing the magnet 98, this being effected upon closing the normally open switch 101 of the control circuit 100 for the power circuit 102 of the magnet 98.

Figure 5:
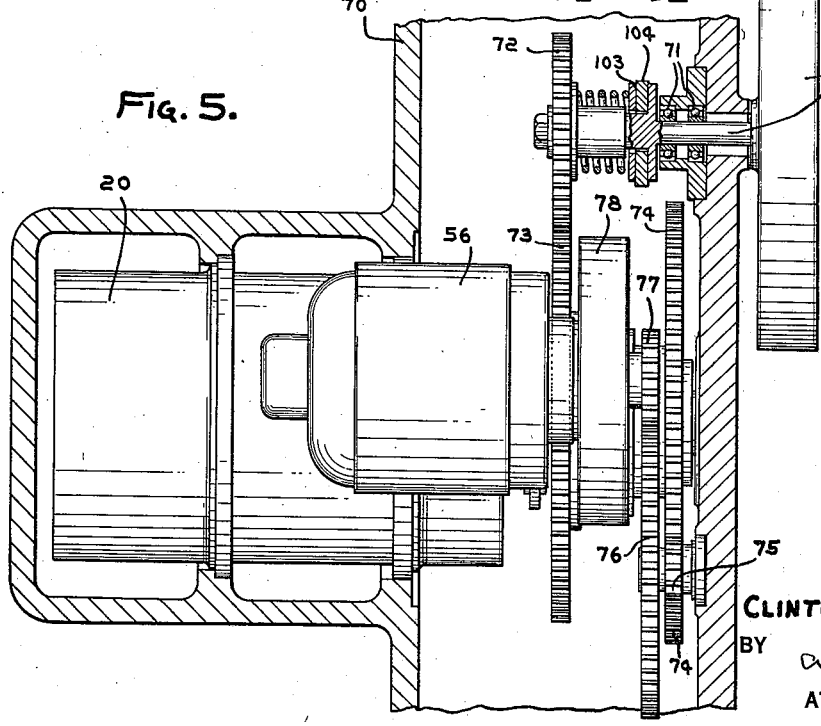
Fig. 5 is a longitudinal sectional view taken along the line V—V of Fig. 2.

As shown in Figs. 1 and 5, the controlling member 6 is connected by a frictional drag clutch 103 to a radial arm 104 (Fig. 3) whose outer end is formed with an obtuse V notch, providing oppositely-inclined cam surfaces 105 which engage the roller 106 carried by one end of the actuating bar 107 having its other end pivoted, at 108, to the structure 109 carrying a casing 110 for the self-opening switch 101. Motion is transmitted from the bar 107 through the leaf spring 111 to the stem 112 of the switch 101.

The drag clutch mechanism is effective, upon initial movement of the controlling member 6, to close the switch 101 of the control circuit, and, upon cessation of such movement, to permit the switch to open. To provide for such operation, a tension spring 113 has one end connected to a pin 114 on the arm 104 and has its other end connected to a pin 115 coaxial with the roller 106 and attached to the bar 107. Upon initial movement of the controlling member 6, the friction of drag clutch is effective to move the arm 104 with the result that one of the oppositely-inclined cam surfaces 105, depending upon the direction of movement, moves the roller out against the force of the spring 113 to close the switch 101. As soon as the shaft 6 comes to a stop, the spring force is applied to the bar and the arm to move these parts until they occupy a position with the roller centered or at the bottom of the notch, the switch 101, of course, opening as soon as permitted by such restoring movement of these parts.

As shown in Fig. 1, closure of the switch 101 actuates a relay 117 to close the control circuit 100, whereupon the relay 118 is operated to close the power circuit 102 for the brake magnet.

Means is provided to prevent application of the brake, at 94, until speed of the controlled mechanism, at 7, declines to a predetermined point. For this purpose, there is shown, by way of example, a relay 119 for the control circuit 100 and which is responsive to voltage supplied to the field element 48 of the generator 10. So long as the voltage in the main generator field has a value high enough to keep the relay 119 closed, the relay 118 will be maintained closed to keep the magnet 98 energized, irrespective of the controlling member having come to a stop with consequent opening of the relay 117. However, as soon as the voltage in the field circuit declines to a predetermined low value, that is, the speed of the controlled mechanism is sufficiently low, then the voltage is no longer effective to keep the relay 119 closed, whereupon the latter opens and causes the relay 118 to open the power circuit for the magnet 98, the spring 97 then being effective to engage the brake.

The power circuit 102 is also controlled by a relay 121 responsive to limit switches 123 and 124, which are normally closed but either of which may be opened as determined by desired limits of amplitude of movement of the controlled member. If either switch is opened, then the control circuit for the relay 121 is opened whereupon the latter opens the power circuit 102 for the magnet, resulting in the brake being applied to quickly retard and stop the controlled mechanism. With either limit switch open, then it is necessary to again close the control circuit 125 for the relay 121 to cause the latter to close the power circuit for the magnet 98, and a switch 126 is provided for this purpose.

Figure 9:
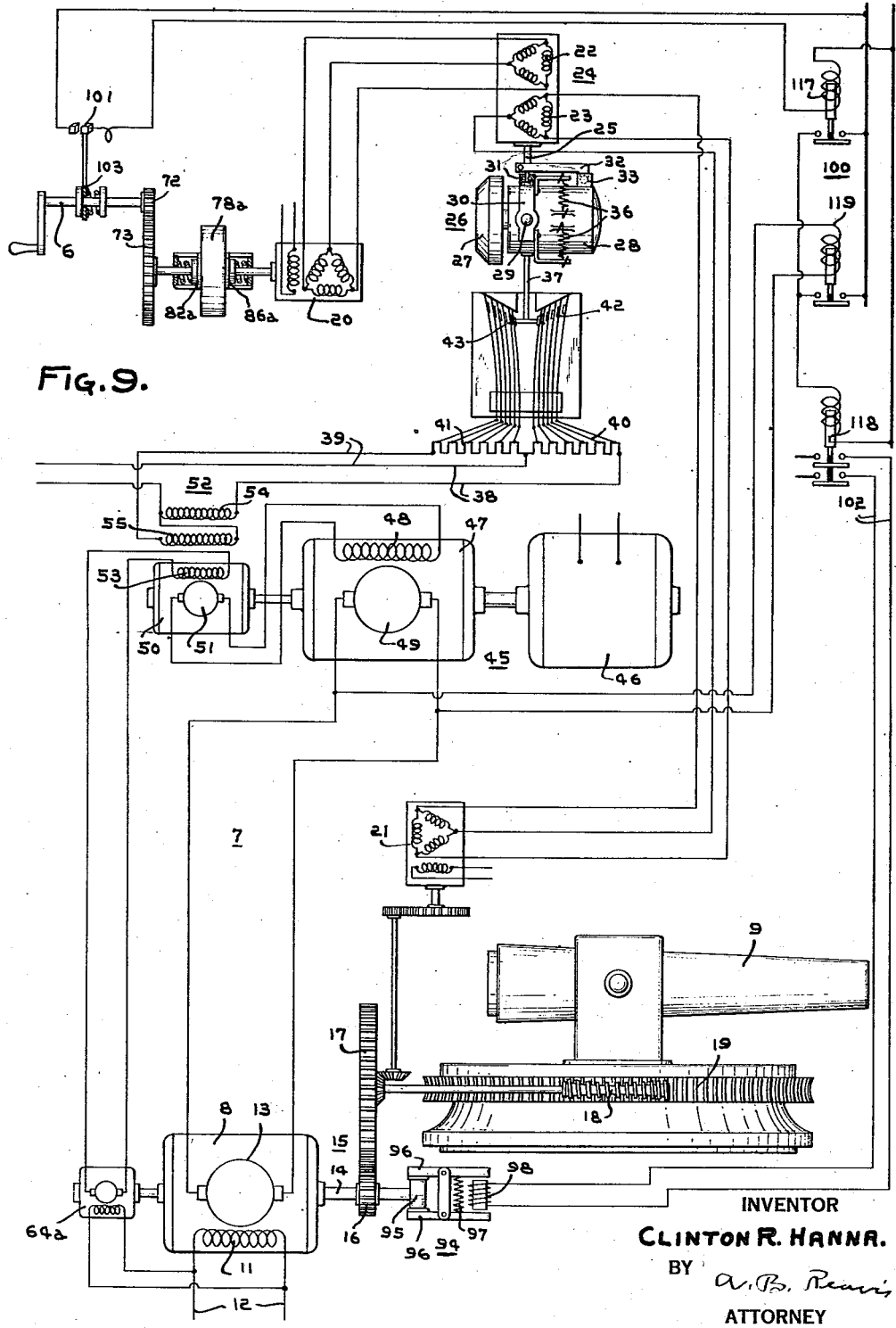
Fig. 9 is a view similar to Fig. 1 but showing a further modified system.

In Fig. 9, there is shown an arrangement similar to that of Fig. 1 in many respects, except that controlling member or input velocity compensation is not used, the compensation being effected entirely by controlled member or output feedback, which in this case is not a damping feedback but a forward or positive feedback. To this end, the driving motor 8 operates an exciter 64a, as heretofore described, and the exciter or generator output is used for exciting the field component 53. The other field component, at 52, is arranged and operated as heretofore described. With this arrangement, only a fraction of the excitation for the generator 50 is furnished by the resistance-controlled circuits 38 and 39, the major portion of the excitation coming from the auxiliary generator exciter 64a driven by the output motor 13. This provides just the right excitation to maintain a given speed and thus relieves the contact-controlled circuits and reduces the angular error between input and output. In large motor drives, the limitation or range covered by the contacts and control circuits 38 and 39 is also a distinct advantage in reducing commutator flashing and also protecting the gearing from extreme overloads.

As already described in connection with Fig. 1, the transmitter 20 is mechanically safeguarded against high accelerations, it being driven through a slip clutch 82a from the controlling member 6. This prevents acceleration or retardation in excess of a fixed maximum which may be adjusted by the relation of friction torque to flywheel inertia. A second slip clutch 86a is placed ahead of the transmitter 20 to allow slipping when the controlling member 6 is rotated faster than the motor output can follow.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In combination, an input member, an output member, a position regulator for the output member and including a reversible motor for driving the output member into positional agreement with the input member, means responsive to motion of the input member and including a gyro responsive to velocity of positional deviation of the latter with respect to the output member to energize the motor to cause the output member to follow the input member, and means effective to energize the motor in proportion to speed of one of said members for maintaining motor speed.

2. In combination, an input member, an output member, a position regulator for the output member and including a reversible motor for driving the output member into positional agreement with the input member, means responsive to motion of the input member and including a gyro responsive to velocity of positional deviation of the latter with respect to the output member to energize the motor to cause the output member to follow the input member, means effective to energize the motor in proportion to input member speed and in a direction to maintain motor speed, and means effective to energize the motor in proportion to output member speed and in a direction to oppose motor velocity.

3. The combination as claimed in claim 2 wherein the energization in proportion to input member speed exceeds energization thereof in proportion to output member speed to provide for input velocity compensation with damped operation.

4. In combination, an input member, an output member, a position regulator for the output member and including a reversible motor for driving the output member into positional agreement with the input member, means responsive to motion of the input member and including a gyro responsive to velocity of positional deviation of the latter with respect to the output member to energize the motor to cause the output member to follow the input member, means effective to energize the motor in proportion to input member speed and in a direction to maintain motor speed, a brake for the motor and the output member, and means responsive to initiation of movement of the input member to release the brake and to cessation of such movement to apply the brake.

5. In combination, an input member, an output member, a position regulator for the output member and including a reversible motor for driving the output member into positional agreement with the input member, means responsive to motion of the input member and including a gyro responsive to velocity of positional deviation of the latter with respect to the output member to energize the motor to cause the output member to follow the input member, a brake for the motor, means including a controlling circuit providing for release and application of the brake, a self-opening switch for said circuit, and means responsive to initiation of movement of the input member to close the switch to render said circuit effective to release the brake and responsive to cessation of such movement to permit the switch to open to render the circuit effective for brake application.

6. The combination as claimed in claim 5 with means for rendering said circuit ineffective to apply said brake until speed of the regulating mechanism is reduced to a predetermined amount.

7. In combination, controlling mechanism including an input member; an output member; position-regulating mechanism for the output member and including a direct current electric motor for driving the output member into positional agreement with the input member, a variable voltage generator for supplying current to the driving motor, a motor for operating the generator; means including a differential connected to said mechanisms and operative to excite the generator for operation of the driving motor to cause the output member to follow the input member; a brake for said driving motor; means for applying and releasing said brake including a controlling circuit; means responsive to initial movement of said input member to render said circuit effective to release the brake and to cessation of such movement to render the circuit effective for brake application; and means responsive to the exciting voltage of the generator to render said circuit ineffective for brake application until the voltage declines to a predetermined amount.

8. The combination as claimed in claim 7 with limit switches operated by the output member to render the circuit effective for brake application.

9. In combination, controlling mechanism comprising an input member, a flywheel, and transmission means connecting the input member and the flywheel and including a friction clutch; an output member; a position regulator for the output member including a motor for driving the latter into positional agreement with the input member; and means responsive to motion of the input member and to the velocity of deviation of the input member with respect to the output member to energize the motor to cause the output member to follow the input member.

10. In combination, controlling mechanism comprising an input member, a flywheel, and transmission means connecting the input member and the flywheel and including a friction clutch; an output member; a position regulator for the output member and including a motor for driving the latter into positional agreement with the input member; a differential including an output element; means for operatively connecting the differential to the controlling mechanism and to the regulator and including a friction clutch arranged between the controlling mechanism and the differential; and means responsive to motion of said output element of the differential and to the velocity of such motion to energize the motor to cause the output member to follow the input member.

11. In combination, controlling mechanism comprising an input member, a flywheel, and speed-increasing transmission means between the input member and the flywheel and including a friction clutch; an output member; position-regulating mechanism for the output member and including a reversible motor for driving the latter into positional agreement with the input member; a pair of electrical transmitters; means for connecting the transmitters to said mechanisms and including a friction clutch forming a part of the controlling mechanism; a differential including a pair of electrical receivers synchronously connected to the transmitters and constituting input elements cooperating with an output element; a gyro having first and second axes which are transverse to each other and to the spin axis; means for connecting said output element and the gyro for displacement of the latter about the first axis to develop torque thereof about the second axis; and means operable in response to displacement of the gyro about the first axis and to torque thereof about the second axis to control the motor to cause the output member to follow the input member.

12. In combination, controlling mechanism including an input member, an output member, position-regulating mechanism for the output member and including a reversible electric motor for driving the latter into positional agreement with the input member, a differential operatively connected to the controlling and to the controlled mechanisms and including an output element, a gyro having first and second axes which are transverse to each other and to the spin axis; means for connecting said output element and the gyro for displacement of the latter about the first axis to develop torque thereof about the second axis, spring means for opposing movement of the gyro away from centered position about the second axis, means operable in response to displacements of the gyro about the first and second axes to energize the motor to cause the output member to follow the input member, and means effective to energize said motor in proportion to speed of at least one of said members to maintain the motor speed.

13. In combination, controlling mechanism including an input member; an output member; position-regulating mechanism for the output member and including a direct current electric motor for driving the output member into positional agreement with the input member, a variable voltage generator for supplying current to said driving motor, and a motor for operating the generator; a differential operatively connected to said mechanisms and including an output element; means responsive to movement of the output element of the differential and including a gyro responsive to the velocity of such movement for exciting the generator for operation of the driving motor to cause the output member to follow the input member; and means for exciting the generator in proportion to velocity of one of said members to maintain driving motor speed.

14. In combination, controlling mechanism including an input member; an output member; mechanism for regulating the position of the output member and including a direct current motor for driving the output element into positional agreement with the input member, a variable voltage generator for supplying current to the motor, and a motor for operating the generator; a differential operatively connected to the mechanisms and including an output element; a gyro having first and second axes which are transverse to each other and to the spin axis; means for connecting said output element and the gyro for displacement of the latter about the first axis to develop torque thereof about the second axis; means operable in response to displacement of the gyro about the first axis and to torque thereof about the second axis to provide for excitation of the generator in opposite directions; and means providing excitation for the generator in proportion to speed of one of the members for maintaining driving motor speed.

15. In combination, controlling mechanism including an input member; an output member; position-regulating mechanism for the output member and including a reversible direct current motor for driving the latter into positional agreement with the input member, a variable voltage generator, a motor for operating the generator, and a circuit for connecting the armatures of the generator and of the driving motor in series; a differential operatively connected to said mechanisms and including an output element; a gyro having first and second axes which are transverse to each other and to the spin axis; means for connecting said output element and the gyro for displacement of the latter about the first axis to develop torque thereof about the second axis; means operable in response to displacement of the gyro about the first axis and to torque thereof about the second axis to excite the generator for operation of the driving motor to cause the output member to follow the input member; means operative independently of said regulator mechanism circuit to excite the generator in proportion to the input member speed and in a direction to maintain driving motor speed; and means for exciting the generator in proportion to output member speed and in a direction to oppose driving motor velocity.

16. In combination, controlling mechanism including an input member; an output member; mechanism for regulating the position of the output member and including a reversible electric motor for driving the latter into positional agreement with the input member, a generator for supplying current to said motor and having first and second field components, and a motor for operating the generator; a differential operatively connected to said mechanisms and including an output element; a gyro having first and second axes which are transverse to each other and to the spin axis; means for connecting said output element and the gyro for displacement of the latter about the first axis to develop torque thereof about the second axis; spring means for opposing movement of the gyro away from centered position about the second axis; means providing for excitation of the first field component in opposite directions comprising a pair of circuits, resistors for the respective circuits, groups of contacts tapped along the resistors, each group of contacts being arranged for progressive engagement and disengagement to progressively shunt and include in circuit portions of the associated resistor, and means including an actuator movable with the gyro about the first and second axes for engaging and disengaging the contacts; and means for exciting the second field component in proportion to speed of one of said members to maintain driving motor speed.

17. In combination, controlling mechanism including an input member; an output member; mechanism for regulating the position of the output member and including a reversible electric motor for driving the latter into positional agreement with the input member, a generator for supplying current to said motor and having first and second field components, and a motor for operating the generator; a differential operatively connected to said mechanisms and including an output element; a gyro having first and second axes which are transverse to each other and to the spin axis; means for connecting said output element and the gyro for displacement of the latter about the first axis to develop torque thereof about the second axis; means operable in response to displacement of the gyro about the first axis and to torque thereof about the second axis to excite the first field component in opposite directions; and means for exciting said second field component in proportion to input member speed and in a direction to maintain driving motor speed and in proportion to output member speed and in a direction to oppose driving motor velocity.

18. In combination, controlling mechanism including an input member; an output member; position-regulating mechanism for the output member and including a motor for driving the output member into positional agreement with the input member, a generator for furnishing electric current to the driving motor and having first and second field components; a differential operatively connected to said mechanisms and including an output element; a gyro having first and second axes which are transverse to each other and to the spin axis; means for connecting said output element and the gyro for displacement of the latter about the first axis to develop torque thereof about the second axis; means operable in response to displacement of the gyro about the first axis and to torque thereof about the second axis to excite the first field component in opposite directions; first and second auxiliary generators operatively connected to said mechanisms; means for connecting the armatures of the auxiliary generators and the second field component in series with the generators arranged in opposed or bucking relation, with the first auxiliary generator normally overcoming the second and effective to excite the second field component in a direction to maintain driving motor speed, and with the second auxiliary generator effective to excite the second field component in a direction to oppose driving motor velocity.

19. In combination, controlling mechanism including an input member; an output member; position-regulating mechanism for the output member including a reversible direct current motor for driving the output member into positional agreement with the input member, a variable voltage generator for supplying current to the motor and having first and second field components, and a motor for operating the generator; a differential operatively connected to said mechanisms and including an output element; a gyro having first and second axes which are transverse to each other and to the spin axis; means for connecting said output element and the gyro for displacement of the latter about the first axis to develop torque thereof about the second axis; means operable in response to displacement of the gyro about the first axis and to torque thereof about the second axis to excite the first field component in opposite directions; an auxiliary exciter operatively connected to said controlling mechanism; a first auxiliary generator excited by said auxiliary exciter; a motor for driving the first auxiliary generator; a second auxiliary generator operatively connected to the regulating mechanism; and means for connecting the armatures of the auxiliary generators and said second field component in series with the generators arranged in opposed or bucking relation, with the first auxiliary generator normally overcoming the second and effective to excite the second field component in a direction to maintain driving motor speed, and with the second auxiliary generator effective to excite the second field component in a direction to oppose driving motor velocity.

CLINTON R. HANNA.